3,029,132
PROCESS FOR PRODUCING SODIUM ZIRCONATE FROM ZIRCONIUM-CONTAINING ORES
Jack W. Blanton, Arlington, Mass., assignor to National Research Corporation, Cambridge, Mass., a corporation of Massachusetts
No Drawing. Filed Feb. 5, 1957, Ser. No. 638,225
3 Claims. (Cl. 23—18)

This invention relates to the production of sodium zirconate.

In recent years, sodium zirconate has become important as an intermediate product in the process for the production of metallic zirconium which is utilized as an alloying constituent in electronic and electrical applications, in chemical equipment where good corrosion resistance is needed and most significantly in nuclear applications.

Heretofore, however, it has been extremely difficult, if not impossible, to produce sodium zirconate which is substantially free of sodium silicate at a relatively high overall production rate.

The procedure commonly used in the prior art for the production of sodium zirconate comprises fusing the zirconium-bearing ore with caustic soda, repeatedly leaching the mixture produced with water and decanting the solids from the aqueous solution in order to remove the water-soluble sodium silicate from the water-insoluble sodium zirconate and finally filtering the leached material to recover the sodium zirconate. One such procedure is described in United States Atomic Energy Commission report ISC–437 (rev.), entitled "Caustic Treatment of Zircon Sand."

However, severe difficulties arise in the leaching operation as taught by the prior art. After the first water-leach of the fused mixture, the settling rate of the sodium zirconate particles in the leach water in subsequent leaches becomes exceedingly slow because the sodium zirconate particles tend to remain suspended in the solution. To cope with this problem, there have heretofore been only two alternatives: (1) allow an exceedingly long period of time after each leach before decanting off the supernatant liquid so that the sodium zirconate particles will have enough time to settle out, or (2) leach the fused mixture only once, decant off the supernatant liquid and then continue on to the filtering operation thereby allowing a large quantity of sodium silicate to remain in the sodium zirconate as an impurity. Either alternative was disadvantageous.

In the instant invention, however, the problem and disadvantages of prior processes have been either solved or circumvented.

Accordingly, it is a principal object of the present invention to provide an improved process for the production of sodium zirconate from a zirconium-bearing ore, such as zircon.

Another object of the instant invention is to provide an improved process for the production of sodium zirconate from a zirconium-bearing ore at a high over-all production rate.

Another object of the invention is to provide an improved process for the production of sodium zirconate which contains only a small quantity of sodium silicate.

Other objects of the invention will in part be obvious and will in part appear hereinafter.

The invention accordingly comprises the process involving the several steps and the relation and the order of one or more of such steps with respect to each of the others which are exemplified in the following detailed disclosure and the scope of the application of which will be indicated in the claims.

For a fuller understanding of the nature and objects of the invention, reference should be had to the following detailed description.

In the process of the instant invention a zirconium bearing ore such as zircon is fused with caustic soda at a temperature above about 500° C. and preferably on the order of about 600° C. to 650° C. Sodium hydroxide and preferably aqueous solutions of sodium hydroxide having a NaOH concentration of about 50 percent by weight have been found to be satisfactory for decomposing zircon. The water takes no part in the actual fusion reaction of the zircon and sodium hydroxide since any water present in the mixture to be fused is driven off by the attendant high temperatures before the reaction commences. An aqueous solution of sodium hydroxide is preferred however because adequate mixing of the zircon and sodium hydroxide is more easily obtained when the sodium hydroxide is in an aqueous solution.

Following the zircon fusion operation, the reaction products which are in the form of frit composed primarily of sodium zirconate, sodium silicates, some unreacted zircon and sodium hydroxide, are water leached several times in order to separate the water insoluble sodium zirconate from water soluble compounds such as the sodium silicates. The supernatant liquid containing the water soluble compounds is subsequently decanted off. After the initial water leach, however, the solid sodium zirconate particles ordinarily settle at an exceedingly slow rate. In the instant invention, the problem is solved by adding sodium hydroxide to the sludge recovered from each decantation operation before further leaching with water. The addition of sodium hydroxide before each addition of the leach water alleviates the problem because the particles of sodium zirconate tend to remain suspended in the solution only after the unreacted sodium hydroxide originally present in the frit due to the fusion operation has been leached out. The chemical or physical mechanism behind the phenomena of the suspension or the reason while the sodium hydroxide addition prior to the leaching procedure alleviates the problem is not understood; however, it has been determined empirically that the addition of sodium hydroxide to the sludge before dilution with the leach water substantially completely alleviates the described phenomena thereby allowing the solid particles to settle out of the solution relatively quickly.

The amount of sodium hydroxide which need be added to the sludge to produce the above-described effect ranges from a lower operability limit of about 1 percent by weight of sodium hydroxide calculated on a dry weight basis of sodium zirconate to the point where the addition of larger quantities of sodium hydroxide becomes practically and economically unfeasible. A minimum concentration of about 2.5 percent of sodium hydroxide is preferred.

It should be emphasized that the described beneficial effect on the settling rate of the solid particles is obtained only if the sodium hydroxide is added to the sludge prior to each dilution with leach water. The chemical or physical mechanism behind this phenomena is also not understood but again it has been determined empirically that only when the sodium hydroxide is added to the sludge prior to the addition of the leach water does the above described beneficial effect on the settling rate occur. If the sodium hydroxide is added to the sludge after the sludge has been diluted with the leach water, or if the sodium hydroxide is added to large quantities of water which are subsequently utilized to dilute the sludge, no beneficial effect on the settling rate of the solid particles is observable.

Finally, subsequent to the leaching operation, the leach sludge is charged into a suitable filtering apparatus where the water soluble materials are further separated from the water insoluble materials. The liquid medium obtained during the filtration operation contains substantially all the minor quantities of sodium silicate remaining in the mixture and a major portion of the sodium hydroxide present. The filtering apparatus may comprise any one of the many well-known types of separating apparatus such as a centrifuge, a rotary vacuum filter or the like. The product obtained comprises sodium zirconate which is substantially free of sodium silicate.

In order to describe the invention more fully, a nonlimiting illustrative example of the invention is set forth below:

*Example 1*

100 grams of sodium zirconate frit, from a fusion kiln reaction of sodium hydroxide and zircon sand, together with 1300 grams of water were agitated for 5 minutes, then placed in a constant temperature hot box at 160°–165° F. in order to clarify. At a settling rate of 3.5 ft./hr., the overflow contained about 100 p.p.m. suspended solids.

The effluent was decanted and the sludge split into two equal parts which were treated as follows:

(a) *One split* was diluted to a calculated 13 to 1 dilution with water and subsequently dosed with 10 cc. concentrated NaOH. The solids settled very slowly leaving a very turbid supernatant liquid.

(b) *The other split* was dosed with 10 cc. concentrated NaOH and *then* diluted to 13:1 dilution with water. The solids settled relatively quickly leaving a substantially clear effluent.

Since certain changes may be made in the above described process without departing from the scope of the invention herein involved, it is intended that all matter contained in the above description shall be interpreted as illustrative and not in a limiting sense.

What is claimed is:

1. In the process for producing sodium zirconate which is substantially free of sodium silicate from a zirconium-containing ore such as zircon, where said ore is fused with caustic soda to produce sodium zirconate and sodium silicate and wherein water-soluble sodium silicate is removed from the mixture by repeatedly leaching said mixture with water and repeatedly decanting off the supernatant aqueous solution containing said soluble sodium silicate, the improvement which comprises adding sodium hydroxide to the sludge from a decanting operation prior to adding water for the next water-leaching operation, the amount of sodium hydroxide added being sufficient to increase substantially the settling rate of undissolved solids in the subsequent leaching operation as compared to the settling rate achieved when no sodium hydroxide is added.

2. In the process for producing sodium zirconate which is substantially free of sodium silicate from a zirconium-containing ore such as zircon, wherein said ore is fused with caustic soda to produce sodium zirconate and sodium silicate and wherein the water soluble sodium silicate is substantially completely removed from the water insoluble mixture by repeatedly leaching said mixture with water and then decanting off the supernatant aqueous solution containing said sodium silicate, the improvement which comprises treating the sludge prior to each leaching operation with a minimum of about 1 percent sodium hydroxide based on the dry weight quantities of sodium zirconate present in said sludge thereby causing the solid particles in the solution to settle quickly during the leaching operation, and making possible the rapid removal of substantially all said sodium silicate from said mixture by means of repeated leachings with water solutions.

3. In the process for producing sodium zirconate which is substantially free of sodium silicate from a zirconium-containing ore such as zircon, wherein said ore is fused with caustic soda to produce sodium zirconate and sodium silicate and wherein the water soluble sodium silicate is substantially completely removed from the mixture by repeatedly leaching said mixture with water and repeatedly decanting off the supernatant liquid containing said sodium silicate, the improvement which comprises treating the sludge prior to each leaching operation with about 2.5% sodium hydroxide based on the dry weight quantity of sodium zirconate present in said sludge thereby causing the solid particles in the solution to settle quickly during the leaching operation, and making possible the rapid removal of substantially all said sodium silicate from said mixture by means of repeated leachings with water solutions.

References Cited in the file of this patent

UNITED STATES PATENTS

| | | |
|---|---|---|
| 1,527,470 | Cooper | Feb. 24, 1925 |
| 1,658,807 | Kinzie | Feb. 14, 1928 |
| 2,696,425 | Kistler | Dec. 7, 1954 |

FOREIGN PATENTS

| | | |
|---|---|---|
| 271,873 | Great Britain | Sept. 24, 1928 |

OTHER REFERENCES

Beyer et al.: A.E.C. publication ISC–437 (re.), August 17, 1954.

Levy: "Rare Earths," published by Longmans, Green and Co., N.Y., 1924, page 253.

Mellor: "Comprehensive Treatise on Inorganic and Theoretical Chemistry," vol. 7, 1927, pages 101–103.